(12) United States Patent
Kumar et al.

(10) Patent No.: US 10,909,737 B2
(45) Date of Patent: Feb. 2, 2021

(54) USING LAYER BLOCKS TO APPLY EFFECTS TO IMAGE CONTENT

(71) Applicant: Adobe Inc., San Jose, CA (US)

(72) Inventors: Nishant Kumar, Siliguri (IN); Vikas Sharma, Gurgaon (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 15/845,696

(22) Filed: Dec. 18, 2017

(65) Prior Publication Data

US 2019/0188889 A1    Jun. 20, 2019

(51) Int. Cl.
*G06T 11/60*    (2006.01)

(52) U.S. Cl.
CPC ................................... *G06T 11/60* (2013.01)

(58) Field of Classification Search
CPC ............... H01M 10/05; H01M 8/2484; H01M 8/04186; H01M 8/04746; H01M 8/04201; H01M 8/2475; H01M 8/188; H01M 2/0257; H01M 8/0221; H01M 2/1016; H01M 10/0422; H01M 4/13; Y02E 60/528
See application file for complete search history.

(56) References Cited

U.S. PATENT DOCUMENTS

| | | | | |
|---|---|---|---|---|
| 2005/0219384 | A1* | 10/2005 | Herberger | G06T 1/0007 348/239 |
| 2011/0243431 | A1* | 10/2011 | Sangappa | G06K 9/00228 382/164 |
| 2015/0131923 | A1* | 5/2015 | van Manen | G06F 16/583 382/284 |

* cited by examiner

*Primary Examiner* — John W Lee
(74) *Attorney, Agent, or Firm* — Kilpatrick Townsend & Stockton LLP

(57) ABSTRACT

Applying an image effect within an image processing application. An image processing application receives a selection of an image effect to be applied to an image. The image includes image layers, each of which has a layer property and is created based on an application of a first effect. The application selects a template from a set of predefined templates. The selection is based on the image effect and the template. The template includes template layers. The application matches each of the image layers to a corresponding template layer having a template property corresponding to the layer property. The application determines from the matching that no conflicts exist between the image layers and the template. The application merges the image layers with the template layers and applies the image effect.

20 Claims, 6 Drawing Sheets

USING LAYER BLOCKS TO APPLY EFFECTS TO IMAGE CONTENT

TECHNICAL FIELD

This disclosure relates generally to image processing. More specifically, but not by way of limitation, this disclosure involves using layer blocks in image content to apply effects to the image content.

BACKGROUND

Image processing applications enable users to edit images or photos and apply effects such as scaling, removing red-eye, or watermarking. The application of an effect involves a certain sequence of steps (i.e., a workflow). Many image processing applications enable users to work with image layers. The application of a workflow, such as steps which create an effect, can create or modify image layers.

Image layers enable the image processing application to apply different effects to an image while maintaining the ability to undo, customize, or remove the effect. Image layers also facilitate more sophisticated editing of images. For example, upon applying an effect in a guided mode (e.g., shape overlays, watermarking, etc.), an image processing application changes one or more image layers, thereby representing the applied effect in the image layers.

Existing image processing solutions for guided effects present certain disadvantages because such solutions do not use workflows to apply guided effects. Existing solutions therefore cannot identify an applied workflow such as an effect applied to an image, merge a first effect with a second effect, detect conflicts between a first and a second effect, or suggest additional relevant effects to a user.

SUMMARY

Systems and methods are disclosed herein for applying an image effect within an image processing application. An image processing application executing on a computing device receives a selection of an image effect to be applied to an image. The image includes image layers, each of which has a layer property and is created based on an application of a first effect. The image processing application selects a template from a set of predefined templates. The selection is based on the image effect and the template. The template includes template layers. The image processing application matches each of the image layers to a corresponding template layer having a template property corresponding to the layer property. The image processing application determines from the matching that no conflicts exist between the image layers and the template. The image processing application merges the image layers with the template layers and applies the image effect.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

DETAILED DESCRIPTION

Figure 1:
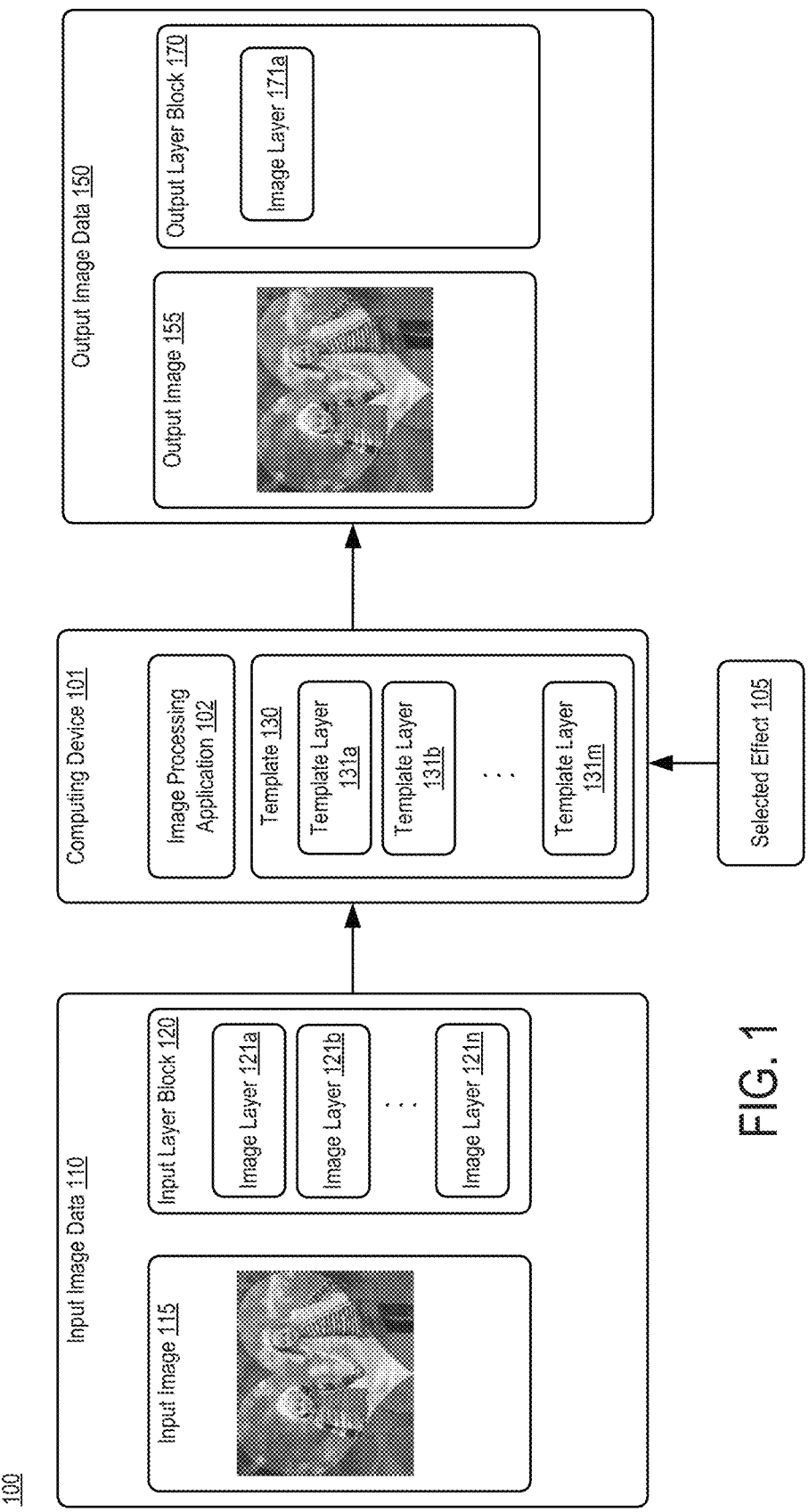
FIG. 1 depicts an example of a computing device for applying effects to images using a layer block approach, according to certain embodiments of the present disclosure.

Embodiments of the present disclosure use layer blocks to solve the disadvantages of existing image processing applications, specifically managing workflows that apply guided effects to image content. As discussed above, existing techniques do not use workflows to apply guided image effects and therefore cannot identify guided edits applied to image content, detect conflicts between guided effects, apply multiple guided effects to an image, or suggest additional relevant effects to a user. A layer block is a set of layers arranged in a particular manner that fits a particular pattern. Analyzing layer blocks allows the use of layer block templates, which in turn allows an image processing application to identify previously-applied effects and whether any conflicts would exist if a new effect were applied. Using layer blocks therefore enables the application of multiple guided image effects to an image and the presentation of additional workflow guidance to a user.

In one example, an image processing application executing on a computing device opens an image file for editing. The image file includes a first, previously-applied shape overlay effect. A shape overlay effect creates a heart placed around two children in the image, where the effect focuses attention on the children by leaving the area inside the heart un-blurred and blurring the image region outside the heart. As a result of the first effect, the opened image contains a layer block with various image layers, each with various properties based on the applied shape overlay.

Subsequently, the image processing application receives a request to apply a second effect, specifically, a black-and-white effect to the image. Before doing so, the image processing application selects a template corresponding to the second effect from a set of predefined templates. The templates represent an expected output of a specific guided effect. The image processing application determines that the user has not previously applied a black-and-white effect by matching specific image layer blocks to specific template layer blocks. More specifically, the image processing application matches the image layers within the image layer block to the template layers in the template layer block.

Based on the match, the image processing application determines whether any conflicts exist between the first, previously applied, effect and the second effect. Examples of conflicts include the user having already applied a shape overlay effect, a particular part of the black-and-white effect conflicting with a particular part of the shape overlay effect. A first effect conflicts with a second effect when the first effect precludes the second effect from being applied.

Based on the image processing application identifying that there are no conflicts, the image processing application merges the image layers with the template layers. The image processing application integrates the effect with the new desired effect by integrating the layers within the matched layer block. Hence, the image processing application has applied both guided effects to the image.

Accordingly, embodiments disclosed herein use layer blocks to analyze layer-based workflows in an image and facilitate the application of multiple guided effects to an image.

Turning now to the figures, FIG. 1 depicts an example of a computing device for applying effects to images using a layer block approach, according to certain embodiments of the present disclosure. In this example, an image processing system 100 includes a computing device 101 that transforms input image data 110 into output image data 150 using a selected effect 105. Image processing system 100 can operate in a guided mode. In guided mode, the image processing application 102 automates the application of sophisticated workflows such as effects.

Image processing system 100 uses layer blocks to manage workflows. A workflow includes the application of image effects such as shape overlay, watercolor, and the like. In so doing, computing device 101 analyzes layer blocks within the image data to be edited, which facilitates the application of effects to an image.

In the example depicted in FIG. 1, image processing application 102 executing on computing device 101 receives input image data 110 from a user. Input image data 110 includes an input image 115 to which a first effect has previously been applied. As shown, input image 115 shows a picture of two children. Here, the first effect is a shape overlay effect which has been previously applied to the image. In this case, input image 115 reflects the application of a heart shape on top of the original image, and the blurring of the area outside the shape. The previous effect could have been applied by image processing application 102, or another application executing on a computing device.

Input image data 110 also includes an input layer block 120. Input layer block 120 represents the changes made to the image when the first effect was applied. Three image layers are discussed in this example for illustrative purposes. But any number of image layers may be present in an image layer block. Input layer block 120 includes three image layers 121a, 121b, and 121c. For example, image layer 121a may be a shape overlay base layer, layer 121b a shape overlay text layer, and layer 121c a shape overlay shape layer. Details about image layers are discussed further with respect to FIG. 6. Image layers 121a, 121b, or 121c may represent the heart image of the shape overlay, the blur effect applied around the heart, etc. Some layers can be background layers, and others can be non-background layers, i.e., representing properties or effects which are applied onto a background layer. Layers can have other properties such as opacity, masks, or whether the step in the workflow is optional or required.

The number of image layers in a layer block and the properties of the layers therein vary by applied workflow. Different applied workflows therefore result in different image layers with different properties. The different image layers create an identity or a signature of the applied workflow, i.e., a previously applied workflow can be identified from the image layers.

The image processing application 102 determines whether a selected effect 105 can be applied to input image 115 based on input layer block 120 and associated image layers 121a, 121b, and 121c and their associated properties. The image processing application 102 determines whether any conflicts exist between the previously applied effect and the selected effect 105.

More specifically, the image processing application 102 receives a workflow request from a user such as a selected effect 105. For example, the user may wish to apply a black-and-white effect to input image 115. The image processing application 102 selects a template 130 that corresponds to the selected effect 105 from a set of predefined templates. The template 130 represents the expected layer structure that is formed after the user completes a corresponding workflow.

Computing device 101 maintains templates for the workflows of commonly applied effects such as double exposure, effects collage, old-fashioned photo, out-of-bounds, painter fly, photo text, picture stack, pop-art, puzzle effect, reflection, shape overlay, speed effect, speed pan, or zoom burst effect. Computing device 101 can also apply more traditional effects such as blur, sharpen, and the like. The computing device 101 maintains templates for other kinds of workflows also, such as the application of effects such as crop and scale. The templates are stored on the computing device 101, or elsewhere such as on a remote device. With a template set for known workflows, image processing application 102 can identify whether a conflict exists between two workflows, such as the application of a second effect and to an image on which a first effect has been applied. The image processing application can also identify whether a particular workflow such as the application of a first effect has been performed.

Therefore, by selecting a template 130 that corresponds to the selected effect 105, e.g., black-and-white, the image processing application 102 knows the expected image layer structure of the input image. A template can have any number of layers, e.g., 131a-m. From the expected layer structure, the image processing application 102 determines whether the selected effect 105 has already been applied to the input image 115. More specifically, the image processing application 102 compares the image layers 121a-n within the input layer block 120 of the input image data 110 with the template layers 131a-m of the template 130. The image processing application 102 determines a degree of match between the template 130 and the input image 115.

Responsive to determining a match between the template 130 and the input image 115, the image processing application 102 can take different actions. For example, given a match between the input image 115 and the template 130, the image processing application 102 determines whether any conflicts exist between the input image 115 and the selected effect 105. As discussed further herein, a previously applied effect can conflict with a desired effect, leading to undesirable results. For example, conflicts include the application of an effect to an input image 115 that already has the same effect applied, or the application of another effect that performs a step of an effect that is already applied.

If the image processing application 102 determines that there are no conflicts, the image processing application 102 merges layers 121a-n of the input image 115 with the template layers 131a-m of the template 130. This merge operation creates an output layer block 170. In this case, the image processing application 102 determines that a selected effect 105, which is a black-and-white effect, does not conflict with the previously applied shape overlay effect.

Figure 2:
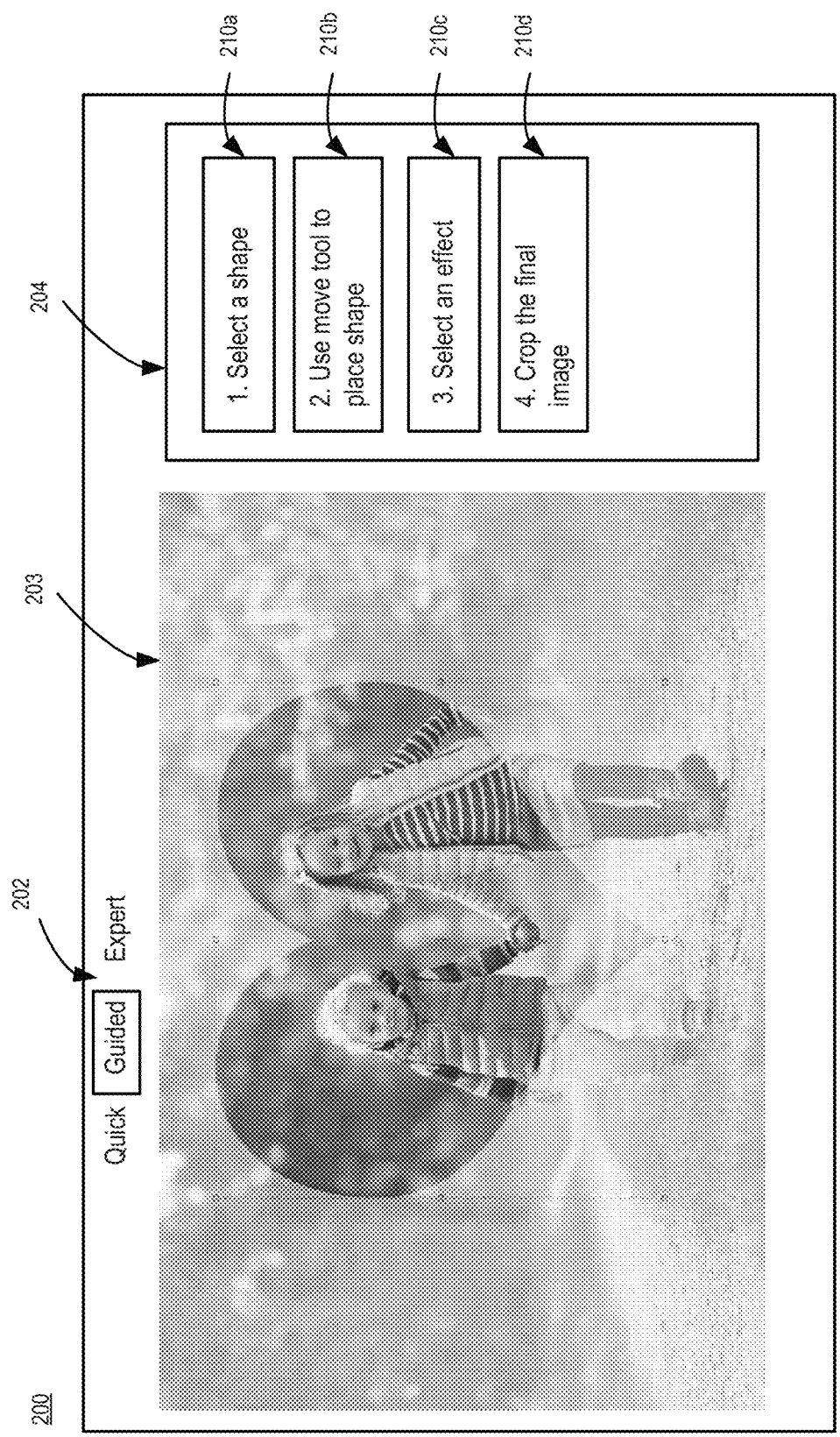
FIG. 2 depicts an example of an interface for applying guided edits to an image, according to certain embodiments of the present disclosure.

FIG. 2 depicts an interface for applying guided edits to an image, according to certain embodiments of the present disclosure. For example, image processing application 102 provides guided workflows. Guided workflows include the application of sophisticated effects such as watercolor or shape overlay, applied by the image processing application 102 in a guided fashion, thereby simplifying the process for the user. User interface 200 shows an edit mode selector 202, an image window 203, and a guided workflow window 204. User interface 200 is implemented, for example, by computing device 101 performing a method 500, as described herein with respect to FIG. 5.

In some embodiments, a user interface 200 is configured via the edit mode selector 202. Edit mode selector 202 is used to configure image processing system 100 to operate in various different modes. In the example of FIG. 2, the edit mode selector 202 provides a "guided" mode, a "quick" mode, and an "expert mode." In guided mode, the image processing application 102 provides various interface features (e.g., prompts for parameters and options, specified sequences of operations, etc.) that aid users in applying sophisticated effects (e.g., motion blur, shape overlay, etc.). In the quick mode, the image processing application 102 performs a limited set of edits as compared to guided mode. In the expert mode, the image processing application 102 performs advanced image operations by providing direct access to the image layers. For example, in expert mode, image processing system 100 performs advanced operations through manual edits to various layers of the input image. In expert mode, the image processing application 102 permits the user to manually edit the layer information such as input layers 121a-n.

In guided mode, the image processing application 102 provides a predetermined workflow to the user, enabling the image processing application 102 to be configured to automatically apply more complex workflows that typically require advanced knowledge and the use of expert mode. To further simplify the editing process for users, in guided mode involves the image processing application 102 displays the possible guided workflows in different categories. For example, the effects could be grouped into "basics," "color," "black and white," etc.

Image window 203 shows a preview of an image on which a shape overlay effect has been applied. In this example, a guided workflow window 204 has steps 210a-d that the workflow for the user. As shown, the image processing application 102 presents steps 210a-d to the user, each of which can be a combination of multiple advanced effects into one step. This way, the user can more easily apply advanced effects without the need for detailed knowledge of the underlying details.

For example, guided workflow step 210a prompts the user to select the shape used for the shape overlay. The user does not need to manually create shapes. Rather, the user can select an option provided by the image processing application 102. Guided effect workflow parameter 210b guides the user to move a tool to place a shape, such as a heart (as depicted in FIG. 2), different kinds of stars, rectangles, or a spade shape. By receiving input from the user via a user move tool, the image processing application 102 moves the shape around while updating the image 201 in real-time. Guided workflow step 210c prompts the user to select an additional desired effect to be applied in conjunction with the shape overlay. For example, a shape overlay effect provides different effects inside and outside the shape. Effects include filters and the like. Guided workflow step 210d prompts the user to crop the final image to the dimensions of the shape. For example, the image processing application 102 crops the image shown in image window 203 to a square or rectangle in which the overlay shape, e.g., the heart, is contained. In some embodiments, the image processing application 102 automates the sharing of the image shown in image window 203 via social media, email, file upload, etc.

Figure 3:
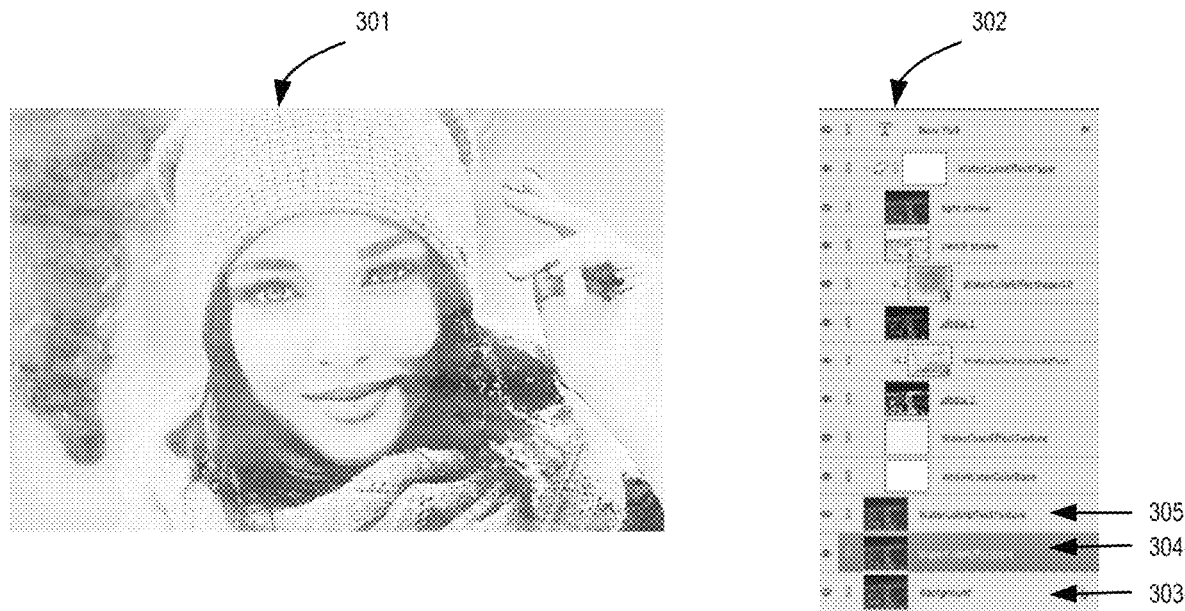
FIG. 3 depicts an example of output from a watercolor effect and associated image layer structure, according to certain embodiments of the current disclosure.
Figure 4:
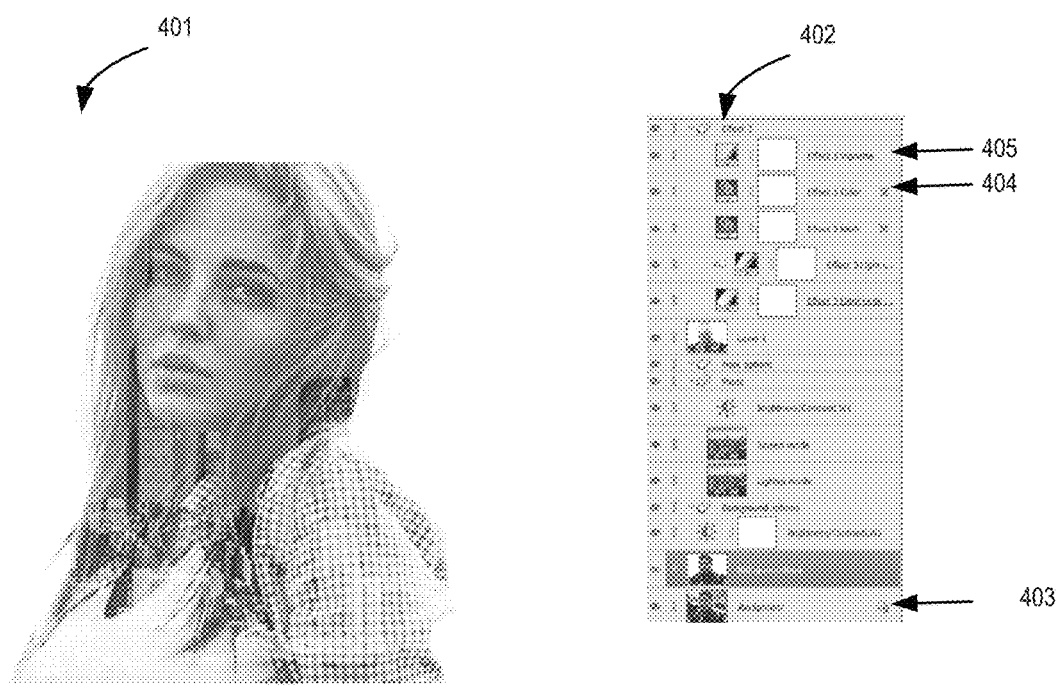
FIG. 4 depicts an example of output from a double exposure effect and associated image layer structure, according to certain embodiments of the current disclosure.

As discussed, image layers 121a-c within input layer block 120 of the input image 115 enable the image processing application 102 to analyze layer-based workflows in the input image 115 and thereby facilitate the application of multiple guided effects to an image. Because different workflows create different layers with different properties, given an input image 115, image processing application 102 can also determine which, if any, effects were previously applied to the input image 115 by examining the layer structure 121a-n. FIGS. 3 and 4 show images with different applied image effects and the layers resulting therefrom. For example, the image processing application 102 can determine the effects applied to the images in FIGS. 3-4 based on the resulting image layer blocks.

For example, FIG. 3 depicts an example of output from a watercolor effect and associated image layer structure, according to certain embodiments of the current disclosure. Image 301 shows an applied watercolor effect and layer structure 302 shows the resulting image layers following the application of the watercolor effect. Background image layer 303, which represents the original image, is present before and after the watercolor effect is applied. Additional layers are added by the application of the effect. For example, image layer 305 is a water color effect texture layer. Similarly, image layer 304 is a water color effect base layer. Image layers 304 and 305 therefore represent, at least in part, the applied watercolor effect.

In this example, the image processing application 102 receives image 301 as the input image 115. The image processing application 102 analyzes the image layers present in layer structure 302 to determine that a watercolor effect was previously applied. Image processing application 102 subsequently determines whether a conflict exists with a selected effect 105, suggests additional workflows to the user, or some combination thereof.

FIG. 4 depicts an example of output from a double exposure effect and associated layer structure. Image 401 shows an applied double exposure effect and layer structure 402 shows the resulting layer structure following the application of the effect. Background layer 403 is present before and after the double exposure effect is applied. Background layer 403 represents the original image. For example, layer 405 is a vignette layer. Similarly, layer 404 is the color of the effect layer. Image processing application 102 analyzes the layers present in layer structure 402 to identify any previously applied workflows. With respect to image 401, the image processing application 102 can determine that a double exposure effect was previously applied.

The layers created by the application of a workflow, such as image layers 304 and 305 of FIG. 3, and layers 404-405 of FIG. 4, provide information that the image processing application 102 can use to determine the effect applied to a particular image. The image processing application 102 uses layer properties, such as the name of a layer, the type of the layer, a layer value, a style, a blending mode used, the opacity value of the layer, or whether the layer has a mask. For example, by using these and other properties, the image processing application 102 can determine that a watercolor effect was applied to image 301 by analyzing image layers 304 and 305 and that a double exposure effect was applied to image 401 by analyzing layers 404 and 405.

By determining the workflow applied to an image, the image processing application 102 can perform various actions such as detecting whether the application of another workflow can cause a conflict to the image, recommending some future action to a user based on the detected workflow, or some other action.

Figure 5:
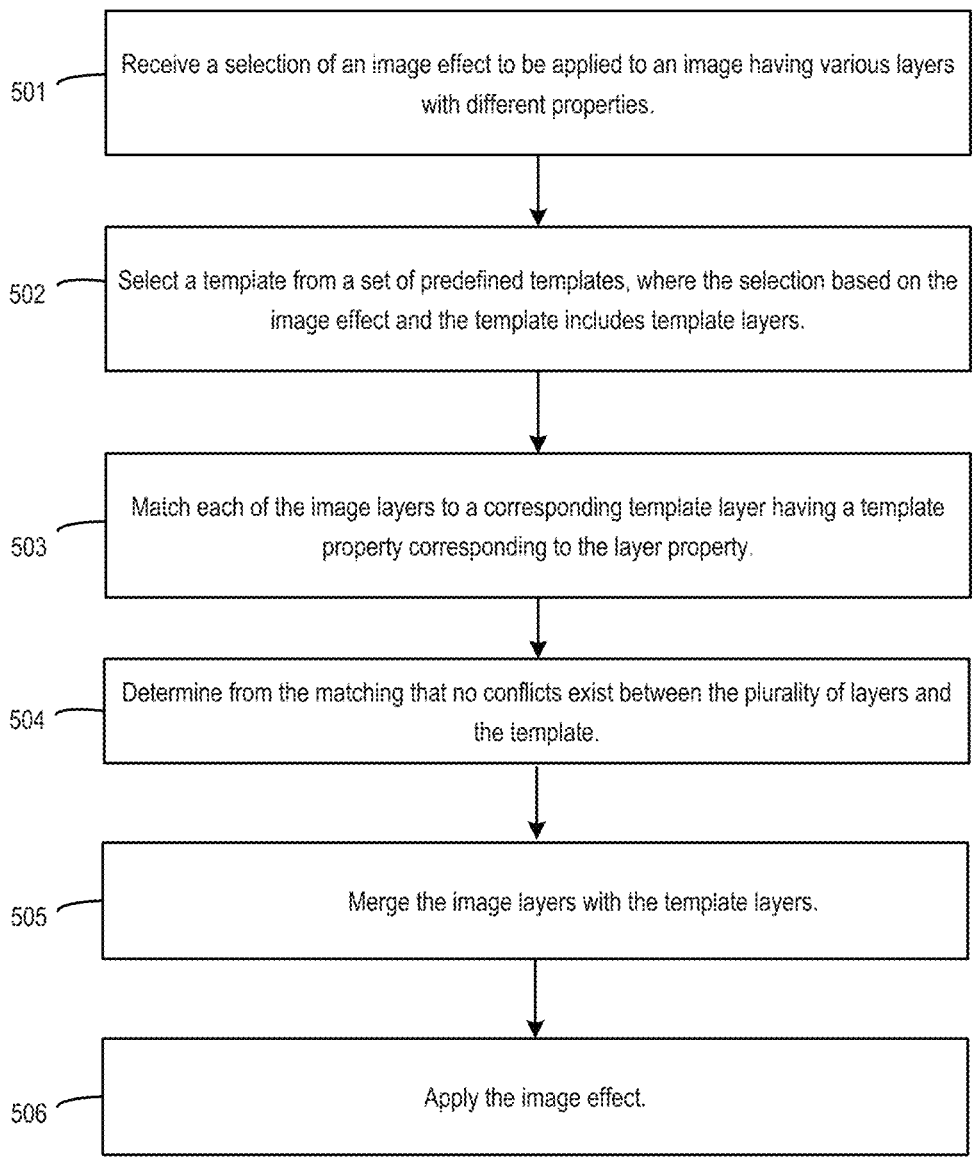
FIG. 5 depicts an example of a method for analyzing workflows that use image layers, according to certain embodiments of the present disclosure.

For example, FIG. 5 is an example of a method for analyzing workflows that use layers, according to certain embodiments of the present disclosure. The image processing application 102 performs the method 500 by analyzing the workflow present in an input image data 110 and applying selected effect 105.

At block 501, method 500 involves receiving a selection of an image effect to be applied to an image having various layers with different properties. For instance, image processing application 102 receives a selected effect 105 from a user. The selected effect 105 represents an effect that the user wishes to apply to the input image 115. The image processing application 102 can also receive a selected effect 105 from a user that corresponds to a watercolor effect such as the one previously applied to image 301, or a double exposure effect as previously applied to image 401. For example, as discussed with respect to FIG. 2, the user wishes to apply a black-and-white effect.

At block 502, method 500 involves selecting a template from a set of predefined templates, where the selection is based on the desired image effect and the template includes template layers. The image processing application 102 receives the selected effect 105, representing the effect that a user desires to apply to the input image 115. The image processing application 102 selects a template 130 that corresponds to the selected effect 105 from the set of templates. For example, if the selected effect 105 is a black-and-white effect, as shown in FIG. 2, then the image processing application 102 selects a black-and-white effect template. Similarly, if a user desired to apply a watercolor effect, then the image processing application 102 would select a template based on a watercolor effect.

At block 503, method 500 involves matching each of the image layers to a corresponding template layer having a template property corresponding to the layer property. Image processing application 102 uses the template properties to determine whether the input image 115 matches or conflicts with the selected effect 105. More specifically, the image processing application 102 compares image layer 121a within the input layer block 120 of the input image data 110 with the template layer 131a of template 130, image layer 121b with template layer 131b, and so on. The image processing application 102 can use all of the properties or specific properties of a layer to determine whether there is a match.

Figure 6:
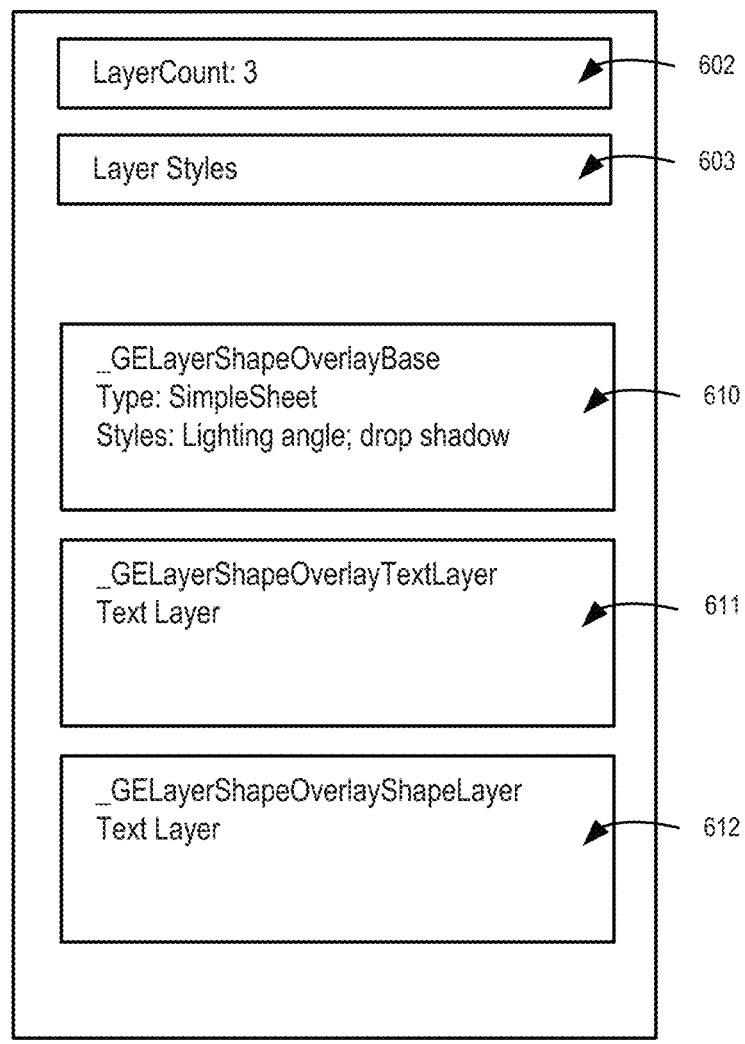
FIG. 6 depicts an example layer block, according to certain embodiments of the present disclosure.

FIG. 6 is an example of an image layer block, according to certain embodiments of the present disclosure. The image layer block 600 results from applying a shape overlay effect to input image 115. In this example, the image layer block 600 includes three image layers 610-612, reflected in layer count field 602. Image layer block 600 may include a layer styles block 603. Layer styles block 603 can include styles or properties applicable to all the layers, e.g., image layers 610-612, of image layer block 600.

Image layers 610-612 were added by the image processing application 102 (or another image processing application) based on the application of the shape overlay effect. For example, layer 610 is a shape overlay base layer, layer 611 is a shape overlay text layer, and layer 612 is a shape overlay shape layer. For example, layer 610 is a "SimpleSheet" layer, while layers 611 and 612 are of "Text Layer" type. Layer 610 has two styles, specifically a "lighting angle," and a "drop shadow." Therefore, with respect to the example of FIG. 2, the input image 115 would be expected to have layers with properties similar or identical to image layers 610-612.

Returning to FIG. 5, at block 503, the image processing application 102 matches the image layers of the input image with the template layers. In some embodiments, the image processing application 102 matches a template to an effect based on properties of the image layers 121a-n of the input image 115 and the template 130. More specifically, image processing application 102 detects whether the same types of layers are present in the input image 115 and the template 130.

In some embodiments, the matching involves considering whether the order of the layers within the input image 115 and the template 130 is identical. In other embodiments, the matching is based on a threshold. For example, if a certain threshold of properties within layers 121a-n match with properties of the template 130 then the input image 115 matches with the template.

As discussed, some layer properties are optional. For example, if a particular step in the workflow is not required and is not performed, then a layer matching the step not performed has the property "optional." The image processing application 102 can ignore such an image layer in its match determination.

At block 504, method 500 involves determining, from the matching operation in block 503, that no conflicts exist between the image layers and the template layers. Given a match between the input image 115 and a template, the image processing application 102 determines whether any conflicts exist between the input image 115 and the selected effect 105.

Conflicts exist if one or more layers in the input image 115 are incompatible with one or more layers in a second workflow. For example, due to the layers having the same names or properties, the image processing application 102 may not be able to distinguish between the two layers. Alternatively, the application of a second effect over a first effect may not be possible if the effects create incompatible properties in a particular layer.

A conflict can arise when a first and second effect are identical. Because the image processing application 102 creates multiple layers by the application of an effect to an image, the re-application of the same effect can create a set of layers with the same names or properties as the previous layers. A conflict can also exist when the first and second applied effect have one layer in common, e.g., a layer having the same name or properties.

Conflicts can cause unpredictable software behavior or undesirable image effects. For example, a second applied effect may not look the way the user intended. In another example, the image processing application 102 is unable to resolve the conflict and informs the user that there is an error, leading to an unpleasant user experience.

One example of a conflict is a particular effect being applied twice to the same image. For example, as shown in FIG. 3, image 301 has a watercolor effect applied. The application of an additional watercolor effect to image 301, which already has a watercolor effect applied, can result in the layers representing the first watercolor effect conflicting with the layers of the second watercolor effect. Such a conflict can exist because the layers may have the same name, or the same properties.

Similarly, with respect to FIG. 4, the application of another double exposure effect to image 401 can create a conflict such that the name or properties of the layers of layers such as image layers 403-405 conflict with the layers of the second applied double exposure effect.

In some embodiments, image processing application 102 can detect a conflict between the input image 115 and the selected effect 105. In such embodiments, the image processing application 102 can cause a dialog box or warning to be displayed on user interface 200, that prompts the user to acknowledge the issue. For example, an exemplary dialog box could read: "You have used ShapeOverlay effect before with the same image. Before using ShapeOverlay effect again, we need you to merge your last output." The user can select a "continue" option, which will cause the previous effect to be merged with the new effect. In this manner, the image processing application 102 ensures that the user will not be subjected to conflicts, which can cause strange or unpredictable effects in the image, and are therefore undesirable by the user.

Returning to FIG. 5, at block 505, method 500 involves merging the image layers with the template layers. Based on the image processing application 102 not detecting any conflicts, the image processing application 102 merges the image layers with the template layers and creates an output layer block 170. Merging can take different forms. In some embodiments, image layers from the input layer block 120 are collapsed into one layer as illustrated by 171a and the selected effect is applied on top of the layer block. Collapsing refers to the combination of multiple input image layers into one output image layer. For example, image layers 121a, 121b and 121c from input image 115 are combined into output image layer 171a before the selected effect 105 is applied, as depicted in FIG. 1

In other embodiments, image layers are combined with template layers, resulting in multiple output layers 171a-n in the output image 155. For image layer 121a is combined with template layer 131a, by merging the properties of image layer 121a and template layer 131a to create output image layer 171a. Similarly, image layer 121b is combined with template layer 131b to create output layer 171b, and so on. As a result, the number of layers in the output image 155 equals the number of layers in the input image 115.

At block 506, method 500 involves applying the image effect. More specifically, the image processing application 102 applies the steps in the workflow corresponding to the desired effect to the input image 115. As discussed, the image processing application 102 facilitates guided workflows, where each workflow has multiple steps. More specifically, the image processing application 102 applies each workflow step to the input image 115. For example, the output image 155 shows the application of the selected effect 105 with the first effect. The image processing application 102 updates the output layer block 170, which now reflects the application of both effects.

As discussed with respect to FIG. 6, a layer block can have multiple layers. Each layer can have multiple properties. The following example XML code shows the implementation of a layer block similar to that depicted in FIG. 6.

```
{
"layerCount": 3, // max number of layers that workflow might create
layersinfo": [
    {
        "name": "_GELayerShapeOverlayBase",
        "layerType": "SimpleSheet",
```

-continued

```
        "layerIndexValue": ">0",
        "layerStyles": {
            "lightingAngle": "30";
            "dropShadow": {
                "size": "7",
                "distance": "3",
                "opacity": "35"
                "glow": {
                "inner": {
                "size": "7";
                "opacity": "35"
                }
            }
        }
    },
    "blendingMode": "enumNormal",
    "opacity": "100",
    "locked": true,
    "pixels": "all",
    "hasMask": false,
    "colorCode": "#a7bef2",
    "smartObject": false,
    "optional": false // since some steps in workflow are
    optional, so, this layer might or might not be there
    },
    {
        "name": "_GELayerShapeOverlayTextLayer",
        "layerType": "TextLayer",
        "layerIndexValue": ">0",
        "optional": true
    {
        "name": "_GELayerShapeOverlayShapeLayer",
        "layerType": "TextLayer",
        "layerIndexValue": ">0",
        "hasTransparency": true,
        "percentageTransparency": ">50"
    }
}
```

The systems and methods described herein can also be used to perform other functions and applications that use layer block matching. In one embodiment, the image processing application 102 can use templates to determine a partially completed workflow. For example, if a user has used an image processing application to apply the first three steps of a four-step workflow, then the template enables the image processing application 102 to identify the level of completion and suggest that the user complete the final step.

In another embodiment, guided workflow for a shape overlay can have several workflow steps, such as, steps 201a-d as discussed with respect to the user interface of FIG. 2. More specifically, the image processing application 102 loads an input image 115 from a file. The image processing application 102 can determine which, if any, of these steps 210a-d have been applied to an input image. To do so, the image processing application 102 analyzes input layer block 120, including image layers 121a-c. The image processing application 102 compares the image layers 121a-c to corresponding template from a template in a set of template. The image processing application 102 may iterate through a set of templates until a match is found.

Based on the similarity between layers 121a-c and the layers of the template, the image processing application 102 determines that a user has completed several, but not all, steps of a workflow. For example, the image processing application 102 may determine that the user may have stopped short of completing the last step, such as a cropping at workflow step 210d because expected image layer structure for workflow step 210d is not present in image layers 121a-c. The image processing application 102 thus identifies a partially completed workflow and avoids undoing and completing the entire workflow again. The image processing application thereby saves the computing device 101 from expending additional resources re-applying or re-doing effects previously accomplished by the user.

In a further embodiment, the image processing application 102 can suggest additional or alternative workflows to a user based on a determination that a first workflow has been applied. More specifically, the image processing application 102 analyzes the layer blocks present in the input image 115 and determines that a first workflow has been applied. Based on the first workflow, the image processing application 102 suggests a second workflow.

In an additional embodiment, the application of one workflow may enable new workflows to be applied. For example, a second workflow may not be possible without the completion of a first workflow. As such, the image processing application 102 suggests the second workflow to the user after the first workflow has been detected in the image layers 121a-n.

As discussed, an input image 115 can have properties represented in layers 121a-n. These properties may have been created by the image processing application 102 based on input from a user based on the application of a workflow. For example, a user may have directed the image processing application 102 to apply effects such as darkness, shadow, overlay, etc., and desire to replicate this group of properties to a second image without manually applying every workflow to a second image.

The image processing application 102 can analyze layer blocks present in an input image 115 in order to determine the properties of the input image 115 in order to copy properties from an input image 115 to another image. Based on the user's selection, the image processing application can identify the corresponding properties in the layer block of the input image 115 and permit the user to copy those properties from one image to another image.

For example, one layer of an image might contain properties such as size, distance, and opacity. The image processing application 102 can determine the properties applied to a first image and copy the properties and create a new template containing the properties. The image processing application 102 can then use the template to apply the properties to a second image.

Figure 7:
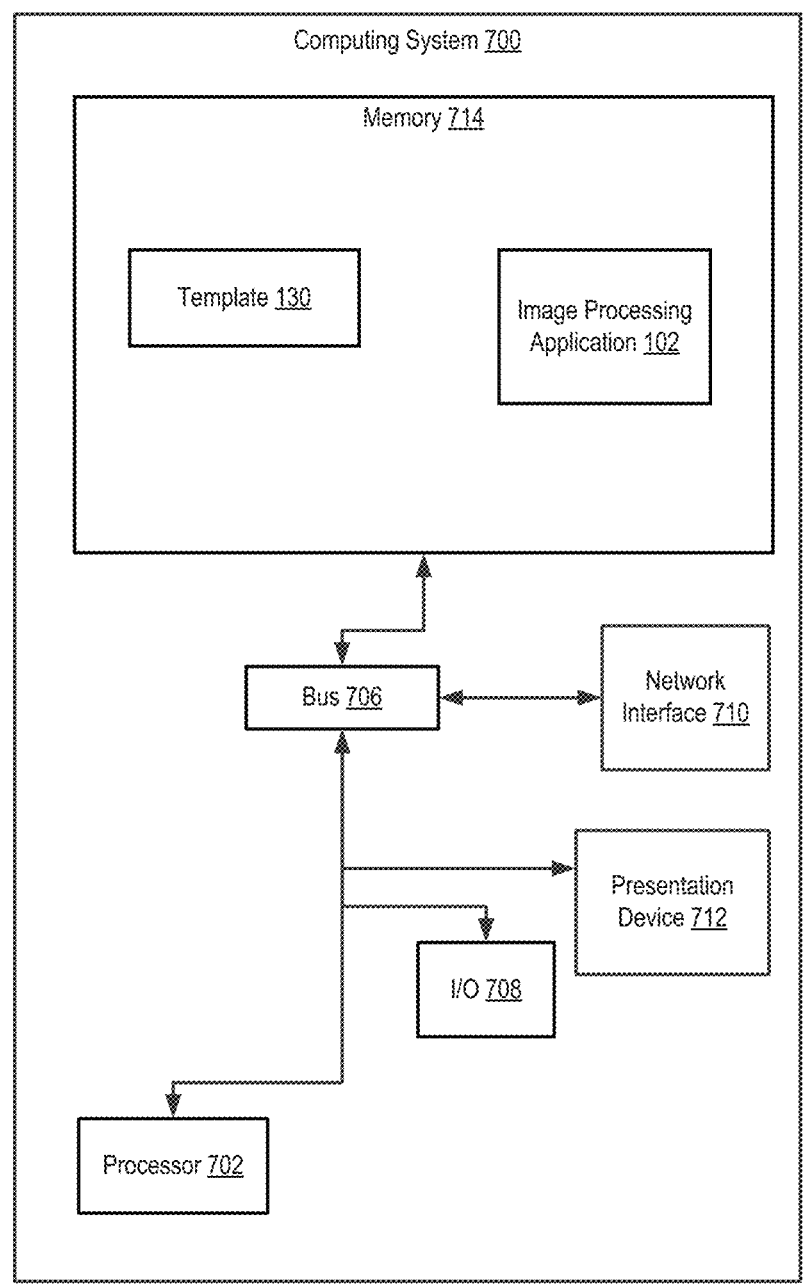
FIG. 7 depicts an example of a computing system used to analyze workflows that use image layers, according to certain embodiments of the present disclosure.

FIG. 7 is an example of a computing system used to analyze workflows that use layers, according to certain embodiments of the present disclosure. Some of the components of the computing system 700 can belong to the computing device 101 of FIG. 1. For example, the image processing application 102 may operate on the computing system 700. The computing system 700 includes one or more processors 702 communicatively coupled to one or more memory devices 714. The processor 702 executes computer-executable program code, which can be in the form of non-transitory computer-executable instructions, stored in the memory device 714, accesses information stored in the memory device 714, or both. Examples of the processor 702 include a microprocessor, an application-specific integrated circuit ("ASIC"), a field-programmable gate array ("FPGA"), or any other suitable processing device. The processor 702 can include any number of processing devices, including one.

The memory device 714 includes any suitable computer-readable medium such as electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 700 may also include a number of external or internal devices such as input or output devices. For example, the computing system 700 is shown with an input/output ("I/O") interface 708 that can receive input from input devices or provide output to output devices. A bus 706 can also be included in the computing system 700. The bus 706 can communicatively couple one or more components of the computing system 700 and allow for communication between such components.

The computing system 700 executes program code that configures the processor 702 to perform one or more of the operations described above with respect to FIGS. 1-5. The program code of the image processing application 102, which can be in the form of non-transitory computer-executable instructions, can be resident in the memory device 714 or any suitable computer-readable medium and can be executed by the processor 702 or any other one or more suitable processor. Execution of such program code configures or causes the processor(s) to perform the operations described herein with respect to the computing device 101. In additional or alternative embodiments, the program code described above can be stored in one or more memory devices accessible by the computing system 700 from a remote storage device via a data network. The computing device 101 and any processes can use the memory device 714. The memory device 714 can store, for example, additional programs, or data such as template 130 used by the applications executing on the processor 702 such as the image processing application 102.

The computing system 700 also includes at least one network interface 710. The network interface 710 includes any device or group of devices suitable for establishing a wired or wireless data connection to one or more data networks. Non-limiting examples of the network interface 710 include an Ethernet network adapter, a modem, and/or the like. The computing device 101 is able to communicate with one or more other computing devices or computer-readable data sources via a data network using the network interface 710.

The computing system 700 includes a presentation device 712. A presentation device 712 can include any device or group of devices suitable for providing visual, auditory, or other suitable sensory output. Non-limiting examples of the presentation device 712 include a monitor, a speaker, a separate mobile computing device, etc.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes poses of example rather than limitation, and does not preclude the inclusion of such modifications, variations, and/or additions to the present subject matter as would be readily apparent to one of ordinary skill in the art.

The invention claimed is:

1. A method of applying an image effect within an image processing application, the method comprising:
   receiving, by the image processing application, a selection of a new image effect to be applied to an image, wherein the image comprises a first image layer that represents the image and a second image layer that (i) represents a previously-applied image effect and (ii) comprises an image layer property that identifies the previously-applied image effect;
   selecting, by the image processing application, a template from a set of predefined templates, wherein the template comprises a template layer, and wherein the template layer represents an expected output of the new image effect and comprises a template layer property;
   comparing, by the image processing application, the image layer property to the template layer property;
   responsive to determining, by the image processing application, that the image layer property matches the template layer property, applying the new image effect by merging the template layer into the second image layer; and
   outputting a new image created from the applied new image effect, wherein the new image comprises the first image layer, and the merged second image layer.

2. The method of claim 1, further comprising:
   determining that a conflict exists between the image layer property and the template layer property; and
   wherein the merging occurs responsive to receiving confirmation from a user device that the template layer is to be merged into the second image layer.

3. The method of claim 1, wherein the merging further comprises combining the first image layer and the second image layer, and wherein applying the new image effect creates an additional image layer corresponding to an additional template layer.

4. The method of claim 1, further comprising:
   selecting, by the image processing application, an additional template comprising an additional template layer comprising an additional template layer property;
   matching, by the image processing application, the image layer property to the additional template layer property;
   determining, by the image processing application, that the additional template layer property does not match the image layer property; and
   applying, by the image processing application, an additional workflow to the image by merging the additional template layer with the first image layer, wherein the additional workflow comprises one or more additional image effects.

5. The method of claim 1, further comprising:
   identifying, by the image processing application, an additional image layer property from the first image layer;
   creating, by the image processing application, an additional template comprising the additional image layer property; and
   applying, by the image processing application, the additional template to an additional image.

6. The method of claim 1, further comprising:
   selecting, by the image processing application, an additional template from a set of predefined templates, the additional template comprising an additional template layer corresponding to a workflow;
   matching, by the image processing application, the additional template to the image by comparing the additional template layer with the first image layer and the second image layer; and
   determining, by the image processing application and based on the matching, that the workflow has been applied to the image.

7. The method of claim 6, further comprising:
   providing, by the image processing application, an option to a user to apply an additional workflow based on the workflow; and
   responsive to receiving confirmation from a user, applying the additional workflow to the image.

8. A system comprising:
   a non-transitory computer-readable medium storing computer-executable program instructions for applying an image effect within an image processing application; and
   a processing device communicatively coupled to the non-transitory computer-readable medium for executing the computer-executable program instructions, wherein executing the computer-executable program instructions configures the processing device to perform operations comprising:
   receiving a selection of a new image effect to be applied to an image, wherein the image comprises a first image layer that represents the image and a second image layer that (i) represents a previously-applied image effect and (ii) comprises an image layer property that identifies the previously-applied image effect;

selecting a template from a set of predefined templates, wherein the template comprises a template layer, and wherein the template layer represents an expected output of the new image effect and comprises a template layer property comparing the image layer property to the template layer;

responsive to determining, by the image processing application, that the image layer property matches the template layer property, applying the new image effect by merging the template layer with the second image layer;

outputting a new image created from the applied image effect, wherein the new image comprises the first image layer and the merged second image layer.

9. The system of claim 8, wherein executing the program instructions further configures the processing device to perform operations comprising:

determining that a conflict exists between the image layer property and the template layer property, and wherein the merging occurs responsive to receiving confirmation from a user that the template layer is to be merged into the second image layer.

10. The system of claim 8, wherein the merging further comprises combining the first image layer and the second image layer, and wherein applying the new image effect creates an additional image layer corresponding to an additional template layer.

11. The system of claim 8, wherein executing the program instructions further configures the processing device to perform operations comprising:

selecting, by the image processing application, an additional template comprising an additional template layer;

matching, by the image processing application, the image layer to the additional template layer;

determining, by the image processing application, that the additional template layer does not match the image layer;

and applying, by the image processing application, an additional workflow to the image by merging the additional template layer with the first image layer.

12. The system of claim 8, wherein executing the program instructions further configures the processing device to perform operations comprising:

identifying, by the image processing application, an additional image layer property from one of the first image layer;

creating, by the image processing application, an additional template comprising the additional image layer property; and applying, by the image processing application, the additional template to an additional image.

13. A non-transitory computer-readable storage medium storing computer-executable program instructions, wherein when executed by a processing device, the program instructions cause the processing device to perform operations comprising:

receiving a selection of a new image effect to be applied to an image, wherein the image comprises a first image layer that represents the image and a second image layer that (i) represents a previously-applied image effect and (ii) comprises an image layer property that identifies the previously-applied image effect;

selecting a template from a set of predefined templates, wherein the template comprises a template layer, and wherein the template layer represents an expected output of the new image effect and comprises a template layer property;

comparing the image layer property to the template layer property and outputting a new image created from the applied image effect, wherein the new image comprises the first image layer, the second image layer, and the template layer.

14. The non-transitory computer-readable storage medium of claim 13, wherein when executed by a processing device, the instructions further cause the processing device to perform operations comprising:

determining that a conflict exists between the image layer property and the template layer property, wherein the conflict indicates that when merged, the first image layer and the template layer cannot later be separated, and wherein the merging occurs responsive to receiving confirmation from a user.

15. The non-transitory computer-readable storage medium of claim 13, wherein when executed by a processing device, the instructions further cause the processing device to perform operations comprising:

selecting an additional template from a set of predefined templates, the additional template comprising an additional template layer and corresponding to a workflow;

matching the additional template to the first image layer by comparing the additional template layer with the first image layer and the second image layer; and determining, based on the matching, that the workflow has been applied to the image.

16. The non-transitory computer-readable storage medium of claim 15, wherein when executed by a processing device, the instructions further cause the processing device to perform operations comprising:

providing an option to a user to apply an additional workflow based on the workflow; and responsive to receiving confirmation from a user device that the additional workflow is to be applied, applying the additional workflow to the image.

17. The non-transitory computer-readable storage medium of claim 15, wherein the merging further comprises combining the first image layer and the second image layer, and wherein applying the new image effect creates an additional image layer corresponding to an additional template layer.

18. The method of claim 1, further comprising:

determining from the second image layer, the applied effect;

identifying, from the plurality of templates, an additional template corresponding to an additional effect; and outputting an indication of the additional template to a user device.

19. The non-transitory computer-readable storage medium of claim 13, wherein when executed by a processing device, the instructions further cause the processing device to perform operations comprising:

selecting an additional template comprising a first template layer and an additional template layer comprising an additional template layer property;

matching the image layer property to the first additional template layer property;
determining that the additional template layer property does not match an additional layer to the image layer property;
determining that the additional template layer does not match the additional layer; and
applying an additional workflow to the image by merging the additional template layer with the additional image layer.

20. The non-transitory computer-readable storage medium of claim 13, wherein when executed by a processing device, the instructions further cause the processing device to perform operations comprising:
identifying an additional image layer property from the first image layer;
creating an additional template comprising the additional image layer property; and
applying the additional template to an additional image.

* * * * *